US012659640B2

(12) United States Patent
Lee et al.

(10) Patent No.: US 12,659,640 B2
(45) Date of Patent: Jun. 16, 2026

(54) ELECTRONIC DEVICE HAVING STRUCTURE FOR GENERATING SOUND THROUGH VIBRATION OF DISPLAY

(71) Applicant: SAMSUNG ELECTRONICS CO., LTD., Suwon-si (KR)

(72) Inventors: Seunghoon Lee, Suwon-si (KR); Youngsik Choi, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 175 days.

(21) Appl. No.: 18/527,924

(22) Filed: Dec. 4, 2023

(65) Prior Publication Data

US 2024/0107213 A1 Mar. 28, 2024

Related U.S. Application Data

(63) Continuation of application No. PCT/KR2022/005007, filed on Apr. 7, 2022.

(30) Foreign Application Priority Data

Jun. 23, 2021 (KR) ........................ 10-2021-0081452

(51) Int. Cl.
*H04R 1/02* (2006.01)

(52) U.S. Cl.
CPC .......... *H04R 1/028* (2013.01); *H04R 2499/11* (2013.01); *H04R 2499/15* (2013.01)

(58) Field of Classification Search
CPC . H04R 1/028; H04R 2499/15; H04R 2499/11
See application file for complete search history.

(56) References Cited

U.S. PATENT DOCUMENTS 9,225,449 B2 12/2015 Heo et al.
9,848,267 B2 12/2017 Watanabe
(Continued)

FOREIGN PATENT DOCUMENTS

JP 2016195353 A 11/2016
KR 20180062320 A 6/2018
(Continued)

OTHER PUBLICATIONS

Korean First Office Action corresponding to Application No. 10-2021-0081452; Dated May 29, 2025.

*Primary Examiner* — James K Mooney
(74) *Attorney, Agent, or Firm* — CANTOR COLBURN LLP

(57) ABSTRACT

According to various embodiments, an electronic device may include: a housing including a first housing oriented in a first direction and a second housing oriented in a second direction that is opposite to the first direction; a display disposed on the surface of the first housing oriented in the first direction; a window disposed on the surface of the display oriented in the first direction; a first adhesive member disposed along the edge of the surface of the display oriented in the second direction, such that the edge of the surface of the display oriented in the second direction is adhered to the surface of the first housing oriented in the first direction; and an actuator which is to positioned in the inner space of the housing so as to be positioned more on the second direction side than the display, and which generates sound by vibrating the display.

15 Claims, 10 Drawing Sheets

(56) References Cited

U.S. PATENT DOCUMENTS

| | | | | |
|---|---|---|---|---|
| 2010/0225600 | A1 | 9/2010 | Dai et al. | |
| 2020/0329304 | A1* | 10/2020 | Yang | G06F 1/1684 |
| 2021/0006876 | A1* | 1/2021 | Moon | H04R 1/345 |
| 2021/0006880 | A1 | 1/2021 | Yan et al. | |
| 2022/0345827 | A1* | 10/2022 | Yu | H04R 9/025 |

FOREIGN PATENT DOCUMENTS

| | | | | |
|---|---|---|---|---|
| KR | 20200077138 | A | 6/2020 | |
| KR | 20200086483 | A | 7/2020 | |
| KR | 20200100359 | A | 8/2020 | |
| KR | 20200115092 | A | 10/2020 | |
| KR | 20210023188 | A | 3/2021 | |
| KR | 20210034822 | A | 3/2021 | |
| WO | WO-2021042877 | A1 * | 3/2021 | H04R 7/04 |

* cited by examiner

ELECTRONIC DEVICE HAVING STRUCTURE FOR GENERATING SOUND THROUGH VIBRATION OF DISPLAY

CROSS-REFERENCE TO RELATED APPLICATION(S)

This application is a continuation application, claiming priority under § 365(c), of International Application No. PCT/KR2022/005007, filed on Apr. 7, 2022, which is based on and claims the benefit of Korean patent application number 10-2021-0081452, filed on Jun. 23, 2021, the disclosures of which are incorporated by reference herein in their entireties.

TECHNICAL FIELD

The disclosure relates to an electronic device sound through a display.

BACKGROUND ART

In general, at least one speaker may be disposed in an electronic device. A conventional electronic device may have a separate speaker hole for emitting sound, and sound generated by the speaker may be radiated to the outside through the speaker hole. However, since speaker holes may harm the aesthetics of an electronic device and affect the waterproof performance of an electronic device, efforts have been made to minimize speaker holes formed in electronic devices (e.g., reduce the number of speaker holes formed in electronic devices). As a result, some methods of applying sound on display (SOD) technology that generates sound through vibration of a display have been developed.

DETAILED DESCRIPTION OF THE INVENTION

Technical Goals

In a conventional sound on display (SOD) structure, there is a determined size of a gap between the rear surface of a display and the front surface of a housing in order to secure a vibrating space of the display. Such a gap has become a factor in increasing a total thickness of an electronic device. In addition, since the rear surface of the display of such SOD structures is not directly supported by the housing due to the gap, the display may be easily damaged when the electronic device is subjected to a drop impact.

According to various embodiments, an electronic device is described in which the thickness of the electronic device may be reduced by reducing the gap between a display of the electronic device and a housing of the electronic device.

According to various embodiments, damage to the display due to a drop impact may be reduced.

According to various embodiments, the vibration force transmitted from an actuator to the display may be improved.

Technical Solutions

According to one or more embodiments of the present disclosure, an electronic device 400 (later illustrated at FIGS. 4A through 4H) includes a housing 410 including a first housing 411 facing a first direction and a second housing 412 facing a second direction opposite to the first direction. The electronic device 400 includes a display 420 disposed on a surface of the first housing 411 facing the first direction. The electronic device 400 includes a window 430 disposed on a surface of the display 420 facing the first direction. The electronic device 400 includes a first adhesive member 440 disposed along an edge of a surface of the display 420 facing the second direction and configured to adhere the edge of the surface of the display 420 facing the second direction to the surface of the first housing 411 facing the first direction. The electronic device 400 includes an actuator 450 located in an inner space of the housing 410 and configured to generate sound by vibrating the display 420, wherein the actuator 450 is located in the second direction relative to the display 420.

In an embodiment, an electronic device 400 includes: a housing 410; a display 420 disposed on a front surface of the housing 410; a window 430 disposed on a front surface of the display 420; a first adhesive member 440 disposed along a rear edge of the display 420 and configured to adhere the rear edge of the display 420 to the front surface of the housing 410; and an actuator 450 disposed in the housing 410 from a rear side of the display 420 and configured to generate sound by vibrating the display 420.

In an embodiment, an electronic device 400 includes: a housing 410 including a first housing 411 facing a first direction and a second housing 412 facing a second direction opposite to the first direction; a display 420 disposed on a surface of the first housing 411 facing the first direction; a window 430 disposed on a surface of the display 420 facing the first direction; a first adhesive member 440 disposed along an edge of a surface of the display 420 facing the second direction and configured to adhere the edge of the surface of the display 420 facing the second direction to the surface of the first housing 411 facing the first direction; and an actuator 450 located in an inner space of the housing 410 and configured to generate sound by vibrating the display 420, wherein the actuator 450 is located in the second direction relative to the display 420. The first housing 411 may include an arrangement portion 4111 in which the actuator 450 is disposed on the surface of the first housing 411 facing the second direction; and at least one cut portion 4112 formed along an outer circumference of the arrangement portion 4111 by cutting a portion of the first housing 411. The electronic device 400 may further include a second adhesive member 470 interposed between the surface of the arrangement portion 4111 facing the first direction and the surface of the display 420 facing the second direction and configured to adhere the surface of the arrangement portion 4111 facing the first direction and the surface of the display 420 facing the second direction to each other. Vibration generated by the actuator 450 may be transmitted to the display 420 via the arrangement portion 4111 and the second adhesive member 470.

Effects

According to various embodiments, a thickness of the electronic device may be reduced by reducing a gap between a display and a housing.

According to various embodiments, the display may be directly adhered to and supported by the housing, which may reduce damage to the display due to a drop impact.

According to various embodiments, acoustic performance may be enhanced by increasing the vibration force transmitted from an actuator to the display.

BEST MODE FOR CARRYING OUT THE INVENTION

Figure 1:
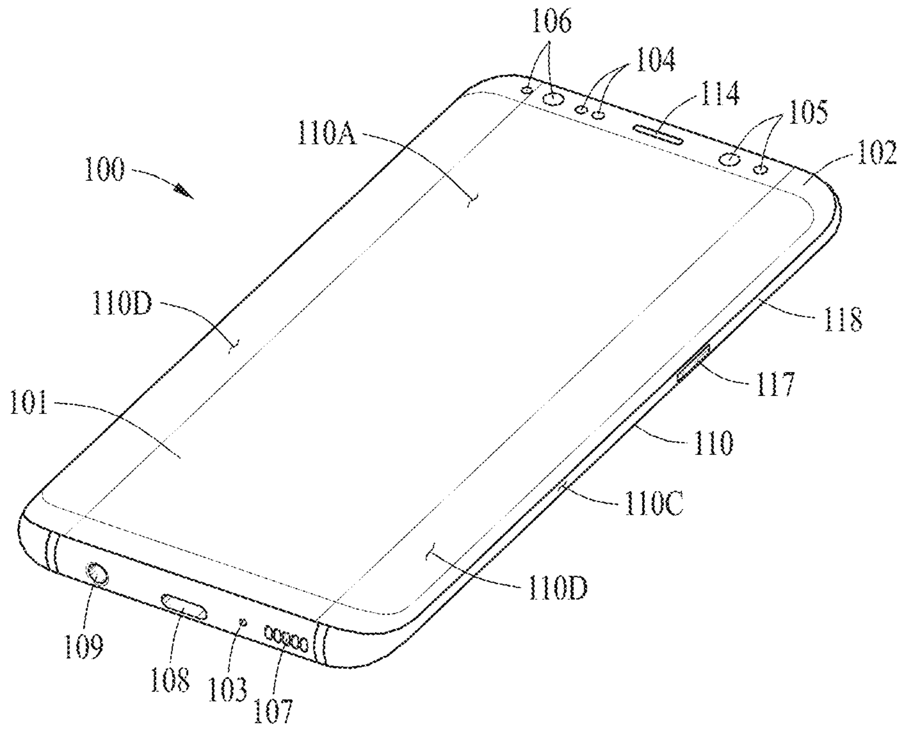
FIG. 1 is a perspective view illustrating a front surface of a mobile electronic device according to an embodiment.

Hereinafter, embodiments are described in detail with reference to the accompanying drawings. When describing the embodiments with reference to the accompanying drawings, like reference numerals refer to like components and a repeated descriptions related thereto are omitted.

Figure 2:
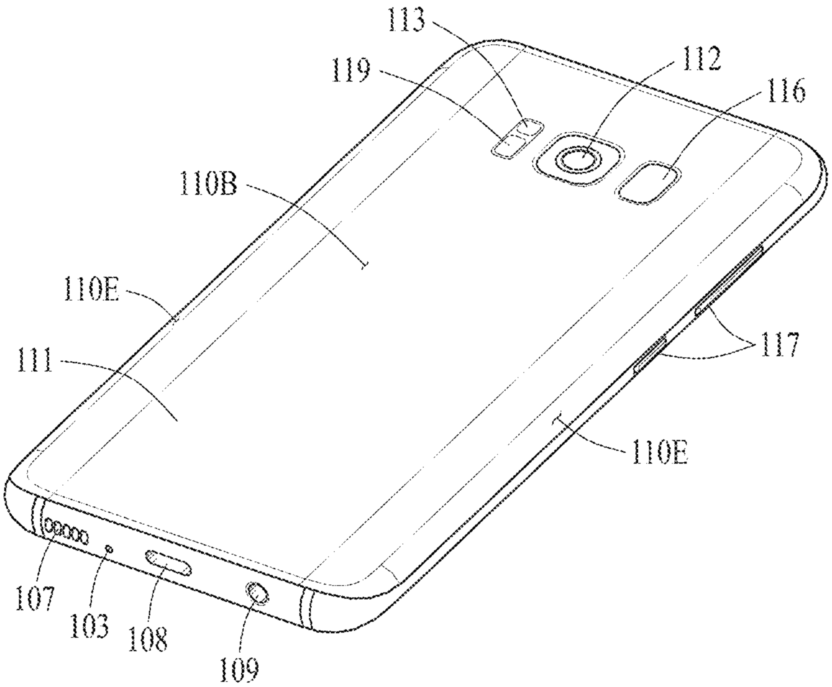
FIG. 2 is a perspective view of a rear surface of the electronic device of FIG. 1.
Figure 3:
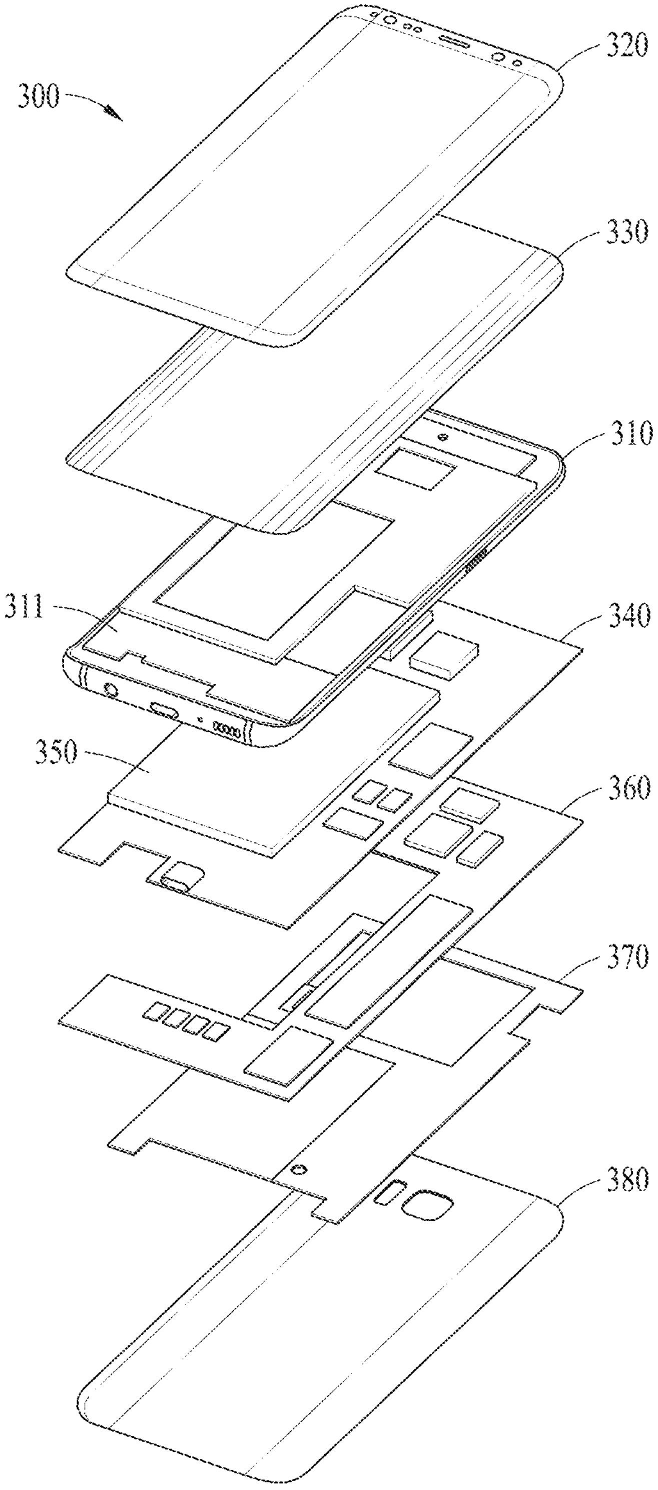
FIG. 3 is an exploded perspective view of the electronic device of FIG. 1.

FIG. 1 is a perspective view illustrating a front surface of a mobile electronic device according to an embodiment. FIG. 2 is a perspective view of a rear surface of the electronic device of FIG. 1. FIG. 3 is an exploded perspective view of the electronic device of FIG. 1.

Referring to FIGS. 1 and 2, an electronic device 100 according to an embodiment may include a housing 110 including a first surface (or a front surface) 110A, a second surface (or a rear surface) 110B, and a side surface 110C surrounding a space, between the first surface 110A and the second surface 110B. In another embodiment (not shown), the housing may also refer to a structure that forms a portion of the first surface 110A, the second surface 110B, and the side surface 110C of FIG. 1. According to an embodiment, the first surface 110A may be formed by a front plate 102 (e.g., a glass plate or a polymer plate including various coating layers), and at least a portion of the front plate 102 is substantially transparent. The second surface 110B may be formed of a rear plate 111 that is substantially opaque. For example, the rear plate 111 may be formed of coated or colored glass, ceramic, polymer, metal materials (e.g., aluminum, stainless steel (STS), or magnesium), or a combination of at least two of the above materials. The side surface 110C may be coupled to the front plate 102 and the rear plate 111 and may be formed by a side bezel structure (or a "side member") 118 including a metal and/or a polymer. In some embodiments, the rear plate 111 and the side bezel structure 118 may be formed integrally and may include the same material (e.g., a metal material such as, for example, aluminum).

In the illustrated embodiment, the front plate 102 may include two first regions 110D that curve and seamlessly extend from the first surface 110A toward the rear plate 111 at both ends of a long edge of the front plate 102. In the illustrated embodiment (see FIG. 2), the rear plate 111 may include two second regions 110E that curve and seamlessly extend from the second surface 110B toward the front plate 102 at both ends of a long edge. In some embodiments, the front plate 102 (or the rear plate 111) may include one of the first regions 110D (or the second regions 110E). In another embodiment, one or more of the first regions 110D or one or more of the second regions 110E may be omitted. In the embodiments described herein, in a side view of the electronic device 100, the side bezel structure 118 may have a first thickness (or width) at a side in which a first region 110D or a second regions 110E is not included, and the side bezel structure 118 may have a second thickness that is less than the first thickness at a side in which a first region 110D or a second region 110E is included.

According to an embodiment, the electronic device 100 may include at least one of a display 101, audio modules 103, 107, and 114, sensor modules 104, 116, and 119, camera modules 105, 112, and 113, a key input device 117, a light-emitting element 106, and connector holes 108 and 109. In some embodiments, the electronic device 100 may omit at least one (e.g., the key input device 117 or the light-emitting element 106) of the components or may additionally include other components.

The display 101 may be exposed through, for example, sonic portions of the front plate 102. In some embodiments, at least a portion of the display 101 may be exposed through the first surface 110A and the front plate 102 forming the first regions 110D of the side surface 110C. In some embodiments, an edge of the display 101 may be formed to be substantially the same shape as an adjacent outer edge of the front plate 102. In another embodiment (not shown), a distance between an outer edge of the display 101 and the outer edge of the front plate 102 may be substantially the same in order to expand an exposed area of the display 101.

In another embodiment (not shown), a recess or an opening may be formed in a portion of a screen display area of the display 101, and at least one of the audio module 114, the sensor module 104, the camera module 105, and the light-emitting element 106 that are aligned with the recess or the opening may be included. In another embodiment (not shown), at least one of the audio module 114, the sensor module 104, the camera module 105, a fingerprint sensor 116, and the light-emitting element 106 may be included in a rear surface of the screen display area of the display 101. In another embodiment (not shown), the display 101 may be coupled to or arranged adjacent to a touch sensing circuit, a pressure sensor for measuring an intensity (pressure) of a touch input, and/or a digitizer for detecting a magnetic-type stylus pen. In some embodiments, at least a portion of the sensor modules 104 and 119 and/or at least a portion of the key input device 117 may be disposed in the first regions 110D and/or the second regions 110E.

The audio modules 103, 107, and 114 may be, for example, a microphone hole 103 and speaker holes 107 and 114. A microphone for acquiring external sound may be disposed in the microphone hole 103. In some embodiments, a plurality of microphones may be disposed to detect a direction of sound (e.g., to detect sound in multiple directions). The speaker holes 107 and 114 may include an external speaker hole 107 and a receiver hole 114 for voice communications (e.g., a call). In some embodiments, the speaker holes 107 and 114 and the microphone hole 103 may be implemented as a single hole, or a speaker (e.g., a piezo speaker) may be included without the speaker holes 107 and 114.

The sensor modules 104, 116, and 119 may generate an electrical signal or a data value corresponding to an internal operating state of the electronic device 100 or an external environmental state. The sensor modules 104, 116, and 119 may include, for example, a first sensor module 104 (e.g., a proximity sensor) and/or a second sensor module (not shown) (e.g., a fingerprint sensor) disposed on the first surface 110A of the housing 110, a third sensor module 119 (e.g., a heart rate monitoring (HRM) sensor), and/or a fourth sensor module 116 (e.g., a fingerprint sensor) disposed on the second surface 110B of the housing 110. The fingerprint sensor may be disposed in the first surface 110A (e.g., the display 101) and in the second surface 110B of the housing 110. The electronic device 100 may further include at least one of other sensor modules (not shown) such as, for example, a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor. In an example, sensor module 104 may be an illuminance sensor.

The camera modules 105, 112, and 113 may be, for example, a first camera device 105 disposed in the first surface 110A of the electronic device 100, a second camera device 112, and a flash 113 disposed in the second surface 110B. The camera modules 105 and 112 may each include one or more lenses, an image sensor, and/or an image signal processor. The flash 113 may include, for example, a light-emitting diode (LED) or a xenon lamp. In some embodiments, two or more lenses (e.g., an IR camera, wide angle and telephoto lenses) and image sensors may be disposed in a surface of the electronic device 100.

The key input device 117 may be disposed in the side surface 110C of the housing 110. In another embodiment, the electronic device 100 may omit some or all of the key input devices 117 described herein. A key input device 117 that is omitted may be implemented in another form such as, for example, a soft key on the display 101. In some embodiments, the key input device 117 may include the sensor module 116 disposed in the second surface 110B of the housing 110.

The light-emitting element 106 may be disposed in, for example, the first surface 110A of the housing 110. The light-emitting element 106 may provide, for example, state information of the electronic device 100 in the form of light, in another embodiment, the light-emitting element 106 may provide, for example, a light source that is interlocked with the operation of the camera module 105. The light-emitting element 106 may include, for example, an LED, an IR LED, and/or a xenon lamp.

The connector holes 108 and 109 may include a first connector hole 108 for accommodating a connector (e.g., a universal serial bus (USB) connector) for transmitting and receiving power and/or data to and from an external electronic device and/or a second connector hole 109 (e.g., an earphone jack) for accommodating a connector for transmitting and receiving an audio signal to and from an external electronic device.

Referring to an electronic device 300 illustrated at FIG. 3, the electronic device 300 may include a side bezel structure 310, a first support member 311 (e.g., a bracket), a front plate 320, a display 330, a printed circuit board (PCB) 340, a battery 350, a second support member 360 (e.g., a rear case), an antenna 370, and a rear plate 380. In some embodiments, the electronic device 300 may omit at least one (e.g., the first support member 311 or the second support member 360) of the components or may additionally include other components. At least one of the components of the electronic device 300 may be the same as or similar to at least one of the components of the electronic device 100 of FIG. 1 or 2, and a repeated description thereof is omitted hereinafter.

The first support member 311 may be disposed inside the electronic device 300 and connected to the side bezel structure 310 or may be formed integrally with the side bezel structure 310. The first support member 311 may be formed from, for example, a metal material and/or a non-metal material (e.g., polymer). The display 330 may be connected to one surface of the first support member 311, and the PCB 340 may be connected to the other surface of the first support member 311. A processor, a memory, and/or an interface may be mounted on the PCB 340. The processor may include, for example, one or more of a central processing unit, an application processor, a graphics processing unit, an image signal processor, a sensor hub processor, and a communication processor.

The memory may include, for example, a volatile memory or a non-volatile memory.

The interface may include, for example, a high-definition multimedia interface (HDMI), a USB interface, a secure digital (SD) card interface, and/or an audio interface. For example, the interface may electrically or physically connect the electronic device 300 to an external electronic device and may include a USB connector, an SD card/multimedia card (MMC) connector, or an audio connector.

The battery 350, which is a device for supplying power to at least one component of the electronic device 300, may include, for example, a primary cell that is not rechargeable, a secondary cell that is rechargeable, or a fuel cell. At least a portion of the battery 350 may be disposed, for example, on substantially the same plane as the PCB 340. The battery 350 may be disposed integrally inside the electronic device 300 or disposed to be detachable from the electronic device 300.

The antenna 370 may be disposed between the rear plate 380 and the battery 350. The antenna 370 may include, for example, a near field communication (NFC) antenna, a wireless charging antenna, and/or a magnetic secure transmission (MST) antenna. The antenna 370 may perform short-range communication with an external device or may wirelessly transmit and receive power associated with charging to and from the external device. In another embodiment, an antenna structure may be formed by a portion of the side bezel structure 310 and/or the first support member 311 or a combination thereof.

Figure 4A:
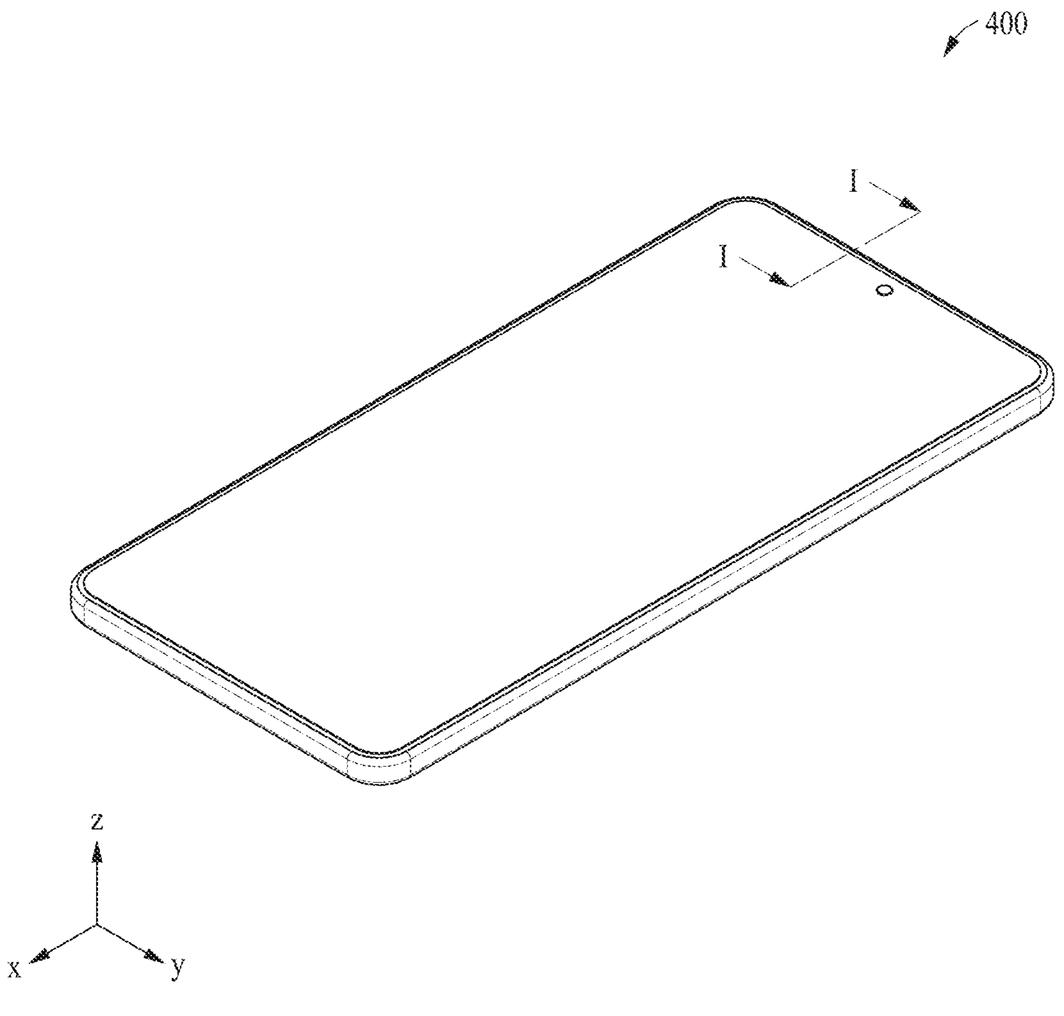
FIG. 4A is a perspective view of an electronic device according to an embodiment.
Figure 4B:
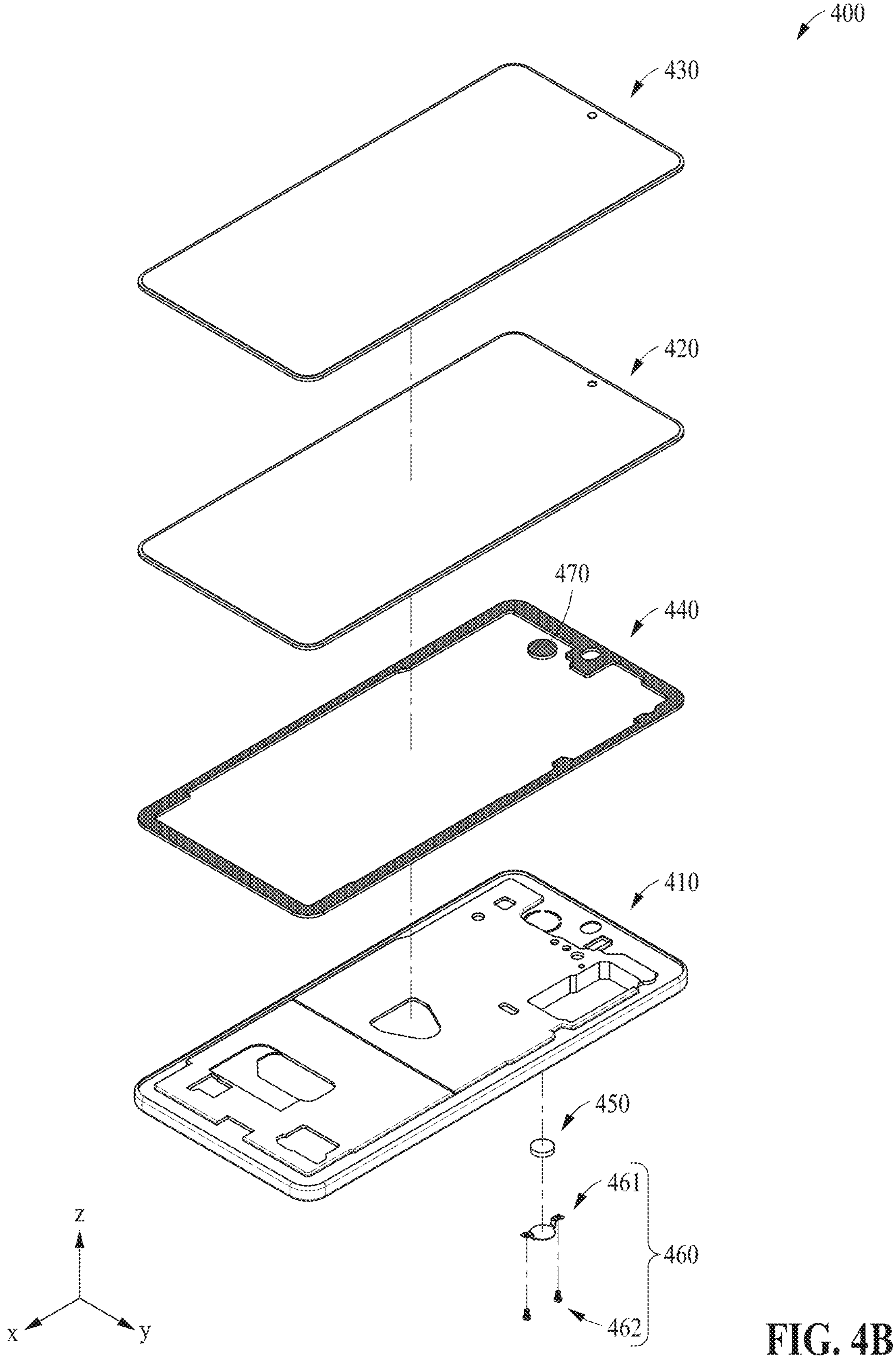
FIG. 4B is an exploded perspective view of the electronic device according to an embodiment.
Figure 4C:
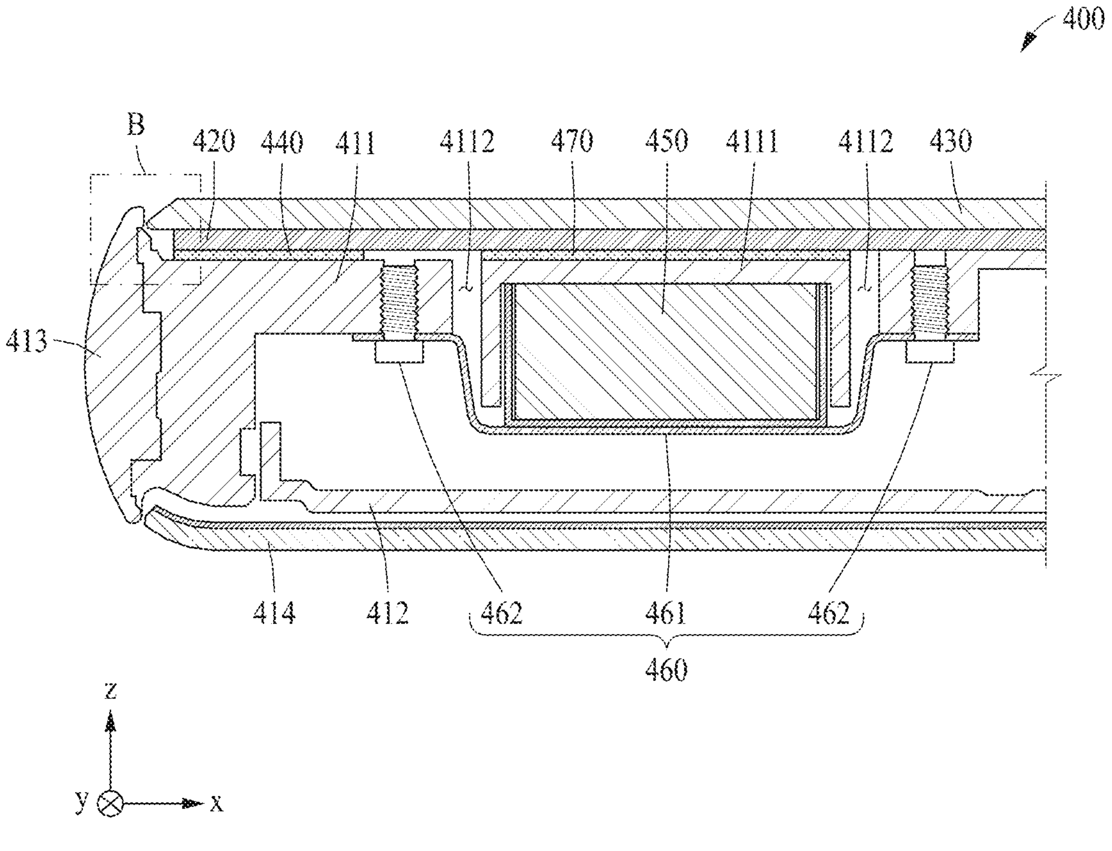
FIG. 4C is a cross-sectional view taken along line I-I of FIG. 4A.
Figure 4D:
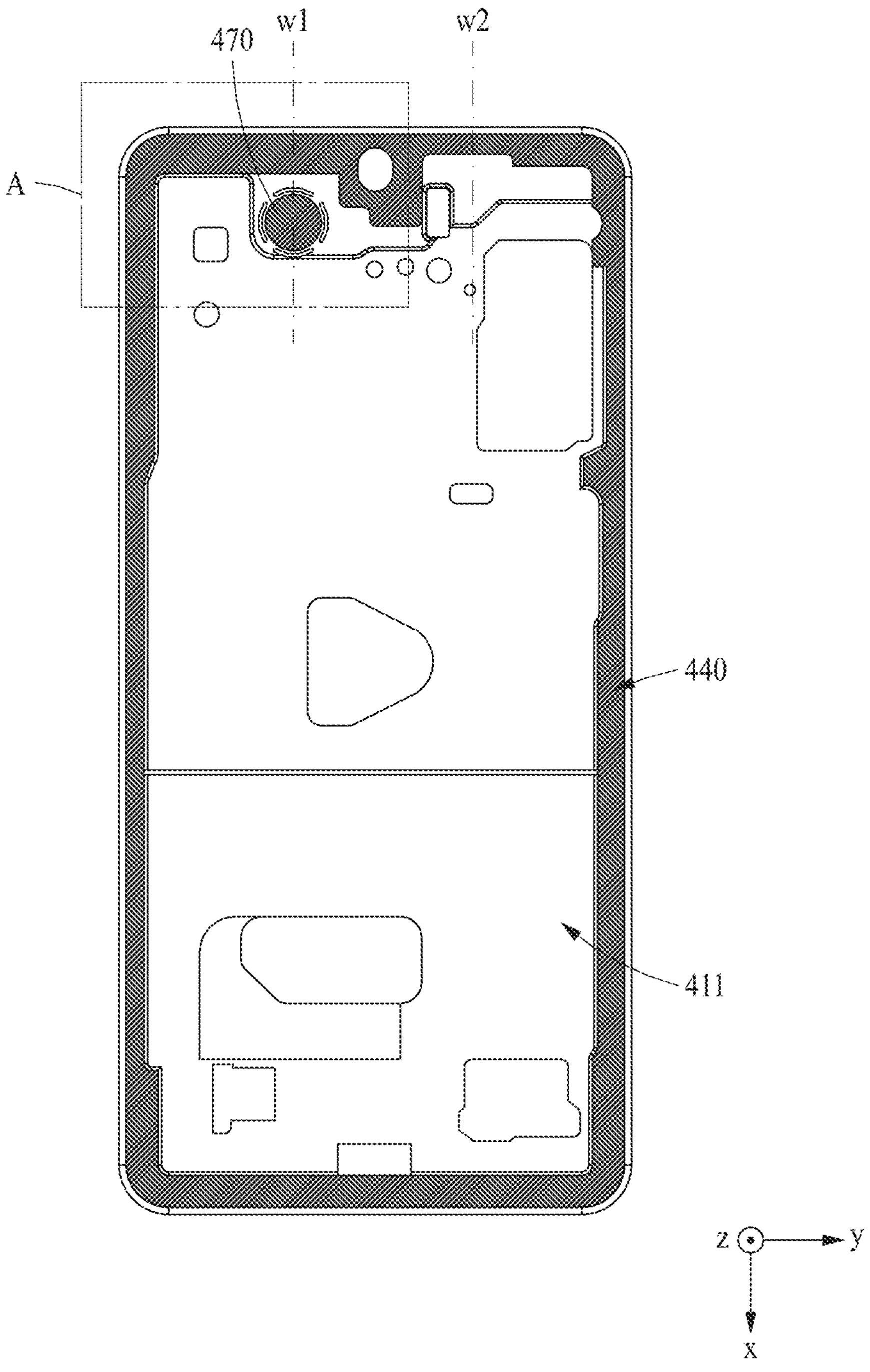
FIG. 4D is a front view illustrating a state in which a first adhesive member and a second adhesive member are adhered to a first housing of the electronic device according to an embodiment.
Figure 4E:
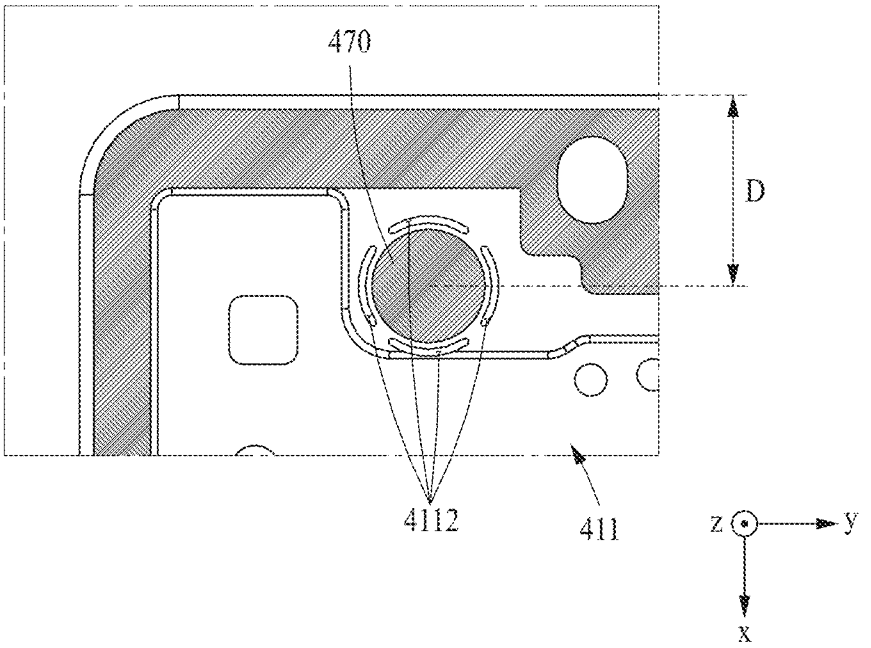
FIG. 4E is an enlarged view of a portion A of FIG. 4D.
Figure 4F:
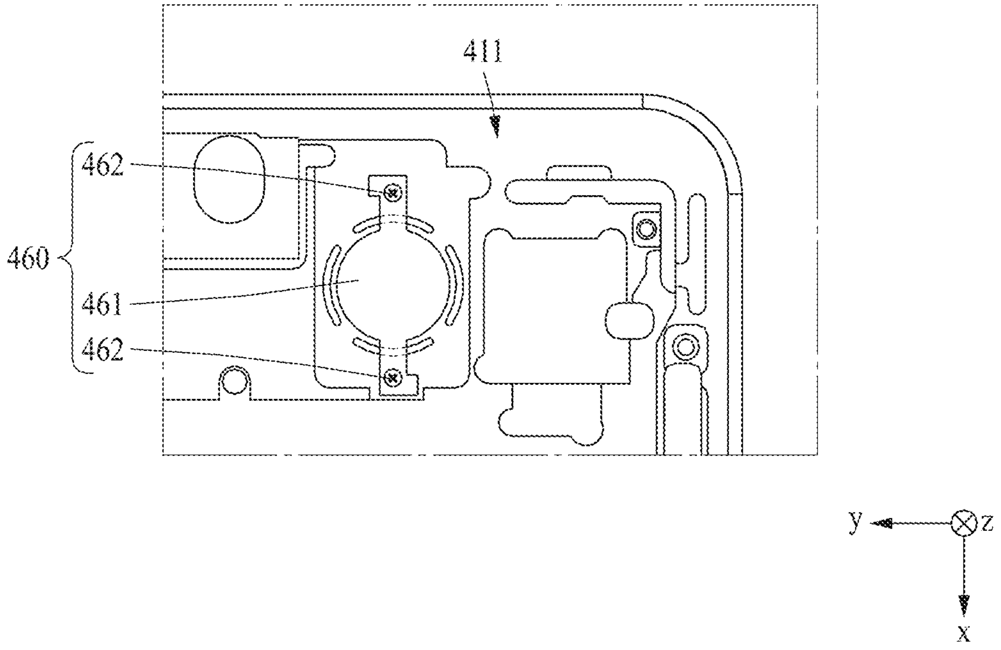
FIG. 4F is a rear view illustrating a state in which a support structure is coupled to a first housing of the electronic device according to an embodiment.

FIG. 4A is a perspective view of an electronic device 400 according to an embodiment. FIG. 4B is an exploded perspective view of the electronic device 400 according to an embodiment. FIG. 4C is a cross-sectional view taken along line I-I of FIG. 4A. FIG. 4D is a front view illustrating a state in which a first adhesive member and a second adhesive member are adhered to a first housing 411 of the electronic device 400 according to an embodiment. FIG. 4E is an enlarged view of a portion A of FIG. 4D. FIG. 4F is a rear view illustrating a state in which a support structure is coupled to the first housing 411 of the electronic device 400 according to an embodiment.

Referring to FIGS. 4A to 4F, an electronic device 400 (e.g., the electronic device 100 of FIG. 1) according to an embodiment may include a housing 410, a display 420, a window 430, a first adhesive member 440, an actuator 450, a support structure 460, and a second adhesive member 470.

Referring to FIGS. 4B and 4C, the housing 410 according to an embodiment may form an exterior of the electronic device 400. The housing 410 according to an embodiment may include a first housing 411, a second housing 412, and a side member 413.

In an embodiment, the housing 410 may form a frame of the electronic device 400. For example, the first housing 411 may form a mid-frame and the second housing 412 may form a rear frame.

In an embodiment, the first housing 411 the first support member 311 of FIG. 3) may form a front surface (e.g., a +Z direction surface) of the housing 410. The first housing 411 may be disposed to face the front surface. The second housing 412 (e.g., the second support member 360 of FIG. 3) may form a rear surface (e.g., a −Z direction surface) of the housing 410. The second housing 412 may be disposed to face the rear surface opposite to the first housing 411. The side member 413 (e.g., the side bezel structure 310 of FIG. 3) may surround a space between the first housing 411 and the second housing 412. Internal components of the electronic device 400 may be disposed in a space formed by at least a portion of the first housing 411, the second housing 412, and the side member 413. The side member 413 may be formed integrally with the first housing 411 or formed integrally with the second housing 412. A cover member 414 (e.g., the rear plate 111 of FIG. 2) may be disposed in a rear surface (e.g., the −Z direction surface) of the second housing 412. In an embodiment, the side member 413 may be disposed outside the first housing 411 or the second housing 412 to form a side surface of the housing 410.

In an embodiment, the display 420 (e.g., the display 101 of FIG. 1) may be disposed in a front surface (e.g., the +Z direction surface) of the first housing 411. The display 420 may visually transmit information to the outside of the electronic device 400. The display 420 may include a plurality of layers. For example, the display 420 may include a thin film transistor (TFT) layer, an electrode layer, an organic material layer, or a pixel layer. However, the configuration of the display 420 is an example, and the configuration of the display 420 is not limited thereto. The display 420 may be formed such that a shape and/or size of the display 420 substantially correspond to the front surface of the first housing 411.

In an embodiment, the window 430 (e.g., the front plate 102 of FIG. 1) may be disposed in a front surface (e.g., the +Z direction surface) of the display 420. At least a portion of the window 430 may be formed to be substantially transparent. At least a portion of the display 420 may be visible to the outside of the electronic device 400 through the transparent portion of the window 430. For example, the window 430 may be formed from a transparent polymer material (e.g., polyimide (PI) or polyethylene terephthalate (PET)) or a glass material. The window 430 may be formed to have a shape in which both the front surface (e.g., the +Z direction surface) and the rear surface (e.g., the −Z direction surface) are flat, a shape in which a partial curvature is formed in the front surface and the rear surface is flat, or a shape in which a partial curvature is formed on both the front surface and the rear surface. However, the material and/or shape of the window 430 as described herein are examples, and the material and/or shape of the window 430 are not limited thereto.

Referring to FIGS. 4B to 4D, the first adhesive member 440 according to an embodiment may adhere the display 420 to the housing 410. The first adhesive member 440 may adhere the rear surface (e.g., the −Z direction surface) of the display 420 to the front surface (e.g., the +Z direction surface) of the first housing 411. The first adhesive member 440 may include, for example, a pressure sensitive adhesive (PSA). The first adhesive member 440 may be disposed along an edge of the rear surface of the display 420. For example, the first adhesive member 440 may be formed to be a closed loop as shown in FIG. 4D. However, the closed loop of the first adhesive member 440 is an example, and the first adhesive member 440 may be formed to be segmented in some sections. The first adhesive member 440 may be formed such that a shape and/or size of the first adhesive member 440 substantially correspond to an edge of the front surface of the first housing 411. The first adhesive member 440 may adhere the edge of the rear surface of the display 420 to the front surface of the first housing 411. In other words, the rear surface of the display 420 and the front surface of the first housing 411 may be adhered to each other at respective edge portions.

By directly adhering the display 420 to the first housing 411 with the first adhesive member 440, a gap between the display 420 and the first housing 411 may be eliminated, and thus, the total thickness of the electronic device 400 may be reduced. According to an embodiment, it has been confirmed that the thickness of the electronic device 400 may be reduced by at least 0.5 mm compared to a conventional electronic device. In addition, since the display 420 is directly adhered to and supported by the first housing 411 without a gap, when the electronic device 400 is dropped, the display 420 may be protected from a drop impact due to being supported by the first housing 411.

Referring to FIGS. 4B and 4C, the actuator 450 (e.g., the audio modules 103, 107, and 114 of FIG. 1) according to an embodiment may convert an electrical signal including sound information into vibration (e.g., a mechanical signal). The actuator 450 may include, for example, a voice coil motor or a piezoelectric actuator but is not limited thereto. The actuator 450 may be located in an inner space of the housing 410. The actuator 450 may be located on the side of the rear surface (e.g., in the −Z direction) relative to the display 420 (e.g., the actuator 450 may be located relatively closer to the rear surface (e.g., in the −Z direction) and further from the display 420). The actuator 450 may generate vibration, and the vibration generated by the actuator 450 may be transmitted at least to the rear surface (e.g., the −Z direction surface) of the display 420. The display 420 may be displaced in a forward/backward direction (e.g., a Z direction) by the vibration transmitted from the actuator 450. In this case, since the edge portion of the display 420 is adhered to the first housing 411, the edge portion of the display 420 may vibrate with a relatively small displacement and a center portion (for example, a portion excluding the edge portion) of the display 420 may vibrate in the forward/backward direction (e.g., the Z direction) with a relatively large displacement. According to the example configuration described herein, the display 420 may function as a diaphragm that generates sound through vibration in the forward/backward direction. In addition, the vibration transmitted to the display 420 may also be transmitted to the window 430 disposed in the front surface (e.g., the +Z direction surface) of the display 420 and the window 430 may also function as a diaphragm that generates sound by vibrating in the forward/backward direction.

Referring to FIGS. 4B to 4E, the first housing 411 according to an embodiment may include an arrangement portion 4111 and a cut portion 4112.

In an embodiment, the arrangement portion 4111 may refer to a portion of the first housing 411 in which the actuator 450 is disposed. The arrangement portion 4111 may be configured to place the actuator 450 in the rear surface (e.g., the −direction surface) of the first housing 411. For example, the arrangement portion 4111 may include a structure protruding in the −Z direction from the rear surface of the first housing 411 to form a space in which the actuator

450 may be disposed. The space formed by the arrangement portion 4111 may have a shape and/or size substantially corresponding to the actuator 450. The actuator 450 may be inserted and disposed in the space formed by the arrangement portion 4111. For example, when the actuator 450 is formed as a cylindrical shape, the arrangement portion 4111 may include a structure protruding in a circumferential shape from the rear surface of the first housing 411, and the actuator 450 (of a cylindrical shape) may be inserted and disposed in the space formed by the arrangement portion 4111. However, the shape and/or structure of the arrangement portion 4111 described herein are examples, and the shape and/or structure of the arrangement portion 4111 are not limited thereto.

In an embodiment, the cut portion 4112 may be formed by cutting a portion of the first housing 411 from the outside of the arrangement portion 4111. The cut portion 4112 may be formed in a position adjacent to an outer circumference of the arrangement portion 4111. The cut portion 4112 may be formed along at least a portion of the outer circumference of the arrangement portion 4111. For example, when the actuator 450 is formed as a cylindrical shape and the arrangement portion 4111 is formed to include a structure protruding in a circumferential shape, the cut portion 4112 may be formed in a circumferential direction along the outer circumference of the arrangement portion 4111. A plurality of cut portions 4112 may be provided. For example, when the actuator 450 is formed as a cylindrical shape and the arrangement portion 4111 is formed to include a structure protruding in a circumferential shape, a plurality of cut portions 4112 may be formed in an arc shape along the outer circumference of the arrangement portion 4111. For example, as shown in FIG. 4E, the cut portions 4112 may be formed in the shape of four arcs spaced apart from each other at predetermined intervals. However, the shape, size, structure, and/or number of the cut portion 4112 described herein are examples, and the shape, size, structure, and/or number of the cut portion 4112 are not limited thereto.

In an embodiment, the arrangement portion 4111 may be substantially formed between a ⅓ point W1 and a ⅔ point W2 (illustrated at FIG. 4D) based on a width direction (e.g., a Y direction) of the electronic device 400. For example, the arrangement portion 4111 may be substantially formed at the ⅓ point W1 or the ⅔ point W2 based on the width direction of the electronic device 400. In addition, the arrangement portion 4111 may be formed spaced apart from an edge of the electronic device 400 (e.g., a top edge of the electronic device 400) by a predetermined distance D. For example, the arrangement portion 4111 may be formed spaced apart from the edge of the electronic device 400 by at least 10 millimeters (mm). The location of the arrangement portion 4111 may correspond to the location of the actuator 450. That is, the actuator 450 may be substantially located between the ⅓ point W1 and the ⅔ point W2 based on the width direction of the electronic device 400 and may be spaced apart from the edge of the electronic device 400 by at least 10 mm. Since the display 420 is adhered to the housing 410 on the edge portion, the edge portion of the display 420 may have a relatively small displacement range due to vibration compared to other portions. Accordingly, it may be advantageous for the actuator 450 to be located at a center portion (e.g., a portion excluding the edge) rather than at an edge portion of the electronic device 400 to vibrate the display 420. For example, as described herein, when the actuator 450 is substantially located between the ⅓ point W1 and the ⅔ point W2 based on the width direction of the electronic device 400 and spaced apart from the edge of the electronic device 400 by at least 10 mm, vibration may be strongly transmitted to the display 420 and the display 420 may vibrate with a large displacement, and thus, acoustic performance may be improved.

In an embodiment, the cut portion 4112 may be a cut region and may reduce transmission of vibration generated by the actuator 450 in an X-Y plane direction through the first housing 411. That is, by forming the cut portion 4112 by partially cutting the first housing 411 around the arrangement portion 4111, dispersion of the vibration generated by the actuator 450 in the X-Y plane direction through the first housing 411 may be reduced. Accordingly, by forming the cut portion 4112, the vibration generated by the actuator 450 may be intensively transmitted to the display 420 located in the +Z direction. As a result, by reducing the dispersion of the vibration generated by the actuator 450 to the X-Y plane and concentrating the vibration in the +Z direction, a vibration force transmitted to the display 420 may be increased, and accordingly, the acoustic performance may be improved.

Referring to FIGS. 4B, 4C, and 4F, the support structure 460 according to an embodiment may support the actuator 450 inside the housing 410. The support structure 460 may support the actuator 450 disposed on the arrangement portion 4111 from the −Z direction. The support structure 460 may fix the actuator 450 to the arrangement portion 4111. The support structure 460 may include a support member 461 and a coupling member 462 (or multiple coupling members 462).

In an embodiment, the support member 461 may be coupled to the first housing 411 to support a rear surface (e.g., the −Z direction surface) of the actuator 450. For example, the support member 461 may include a portion supporting the rear surface of the actuator 450 and a portion coupled to the first housing 411. The support member 461 may be coupled to the first housing 411 through the coupling member 462. For example, the coupling member 462 may couple the support member 461 to the first housing 411 through a screw structure. According to the example coupling structure, as the support member 461 may be strongly coupled to the first housing 411, the support member 461 may bring the actuator 450 into close contact with the rear surface (e.g., the −Z direction surface) of the first housing 411 in the +Z direction and may thus strongly transmit the vibration generated by the actuator 450 in the direction. Accordingly, the vibration force transmitted to the display 420 may be increased and the acoustic performance may be improved. However, the coupling member 462 of a screw-type is an example, and the coupling member 462 is not limited thereto. The coupling member 462 may be formed from an adhesive film or an adhesive.

In an embodiment, the support member 461 may be coupled to the first housing 411 and spaced apart from the second housing 412 in the +Z direction. As shown in FIG. 4C, the support member 461 may be spaced apart from the second housing 412 in the +Z direction and may not come into contact with the second housing 412. According to the example structure, transmission of the vibration generated by the actuator 450 in the −Z direction may be reduced. Accordingly, since the vibration generated by the actuator 450 may be concentrated in the +Z direction, the vibration force transmitted to the display 420 may be increased, and thus, the acoustic performance may be improved.

Referring to FIGS. 4B to 4E, the second adhesive member 470 according to an embodiment may be interposed between the arrangement portion 4111 and the display 420. Specifically, the second adhesive member 470 may be interposed between a front surface (e.g., the +Z direction surface) of the arrangement portion 4111 and the rear surface (e.g., the −Z direction surface) of the display 420. The second adhesive member 470 may adhere the front surface of the arrangement portion 4111 to the rear surface of the display 420. The second adhesive member 470 may include, for example, a PSA. The second adhesive member 470 may form a path in the +Z direction along which the vibration generated by the actuator 450 may be transmitted to the display 420. For example, the vibration generated by the actuator 450 may be transmitted to the display 420 via the arrangement portion 4111 and the second adhesive member 470. Since the actuator 450 is not directly adhered to the rear surface of the display 420 and at least the arrangement portion 4111 and the second adhesive member 470 are interposed between the actuator 450 and the display 420, the vibration generated by the actuator 450 may be prevented from being directly transmitted to the display 420, and damage to the display 420 may be prevented. In addition, the first housing 411 and the display 420 may be in a state of being in contact with each other with substantially no gap in any area, except for the area in which the first adhesive member 440 and the second adhesive member 470 are disposed. In this case, since the display 420 may repeatedly collide with the first housing 411 as the display 420 vibrates in the forward/backward direction (e.g., the Z direction), a buffer member may be interposed in at least a portion of the area between the first housing 411 and the display 420. For example, the display 420 may include the buffer member in at least a partial area.

In an embodiment, a modulus of the first adhesive member 440 may be formed to be different from a modulus of the second adhesive member 470. For example, the modulus of the first adhesive member 440 may be formed to be less than the modulus of the second adhesive member 470. The first adhesive member 440 may be configured to adhere the edge portion of the display 420 to the housing 410 and may have a relatively small modulus in order to secure vibration displacement of the display 420 in the Z direction. According to the example configuration, the Z direction fluidity of the display 420 may be increased and accordingly the Z direction vibration displacement of the display 420 may be increased. For example, the modulus of the first adhesive member 440 may be formed to be 0.05 mega pascals (MPa) or less or 0.04 MPa or less. The second adhesive member 470 may be configured to adhere the display 420 to the arrangement portion 4111 in which the actuator 450 is disposed and may have a relatively large modulus, such that the second adhesive member 470 may strongly transmit the vibration generated by the actuator 450 to the display 420. According to the example configuration, the vibration generated by the actuator 450 may be intensively transmitted to the display 420 along the +Z direction path formed by the arrangement portion 4111 and the second adhesive member 470.

In an embodiment, a modulus may refer to a linear modulus of elasticity. For example, a modulus may refer to Young's modulus (E, young's modulus, young modulus).

Figure 4G:
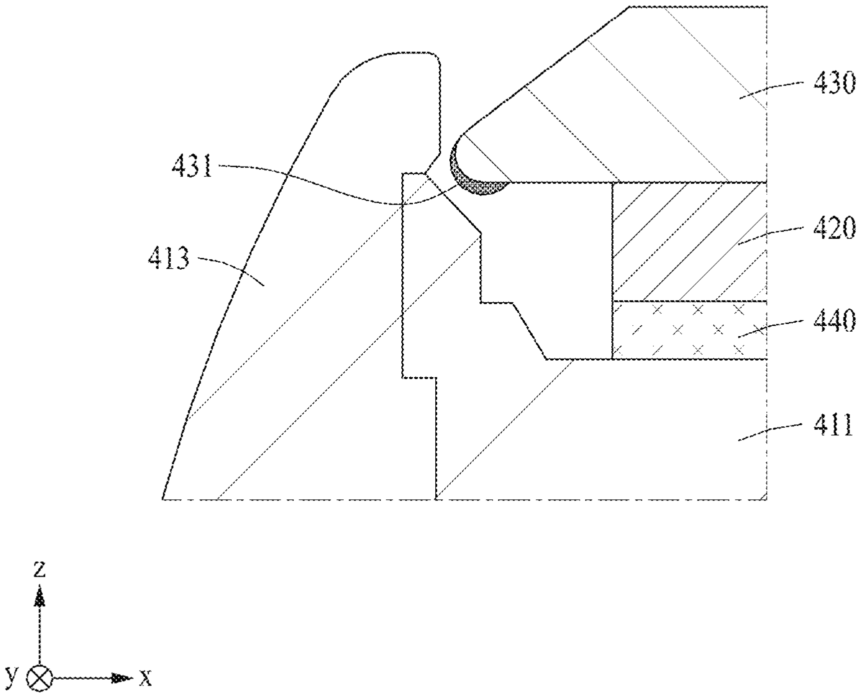
FIG. 4G is an enlarged view of a portion B of FIG. 4C.
Figure 4H:
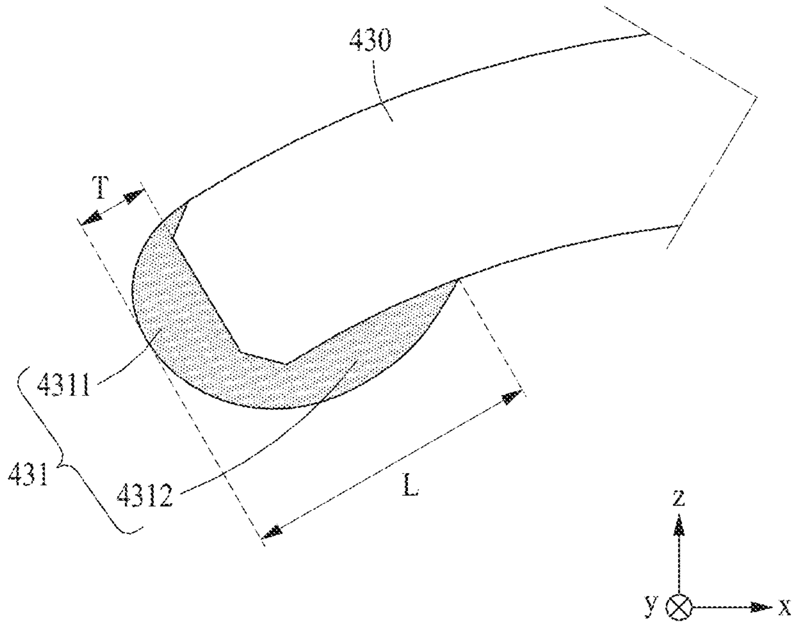
FIG. 4H is a cross-sectional view of a coating layer applied to an edge of a window, according to an embodiment.

FIG. 4G is an enlarged view of a portion B of FIG. 4C. FIG. 4H is a cross-sectional view of a coating layer applied to an edge of a window, according to an embodiment.

Referring to FIGS. 4B, 4C, 4G, and 4H, the edge of a window 430 according to an embodiment may be spaced apart from the housing 410 such that the window 430 is not in contact with the housing 410 (e.g., the side member 413 and/or the first housing 411). Since the display 420 is directly adhered to the housing 410 by the first adhesive member 440, the window 430 may be indirectly fixed to the housing 410 through the display 420, and thus, the edge of the window 430 may be spaced apart from the housing 410 in order not to contact the housing 410 but to have a gap formed therebetween (e.g., such that the window 430 does not contact the housing 410 but has a gap formed therebetween). In this case, as the window 430 may vibrate together due to the vibration of the display 420, the edge portion may repeatedly collide with the housing 410. Therefore, in order to reduce damage to the edge portion of the window 430, a coating layer 431 may be formed on the edge of the window 430. The coating layer 431 may protect the edge of the window 430 from an impact with the housing 410. For example, the coating layer 431 may increase the hardness of the edge portion of the window 430. The coating layer 431 may include, for example, an acrylic coating agent and/or an epoxy coating agent. However, this is an example, and the coating agent of the coating layer 431 is not limited thereto.

In an embodiment, the coating layer 431 may include a first coating layer 4311 and a second coating layer 4312. The first coating layer 4311 may be formed on an edge of a side surface (e.g., the X or Y direction surface) of the window 430. The second coating layer 4312 may be formed on an edge of a rear surface (e.g., the −Z direction surface) of the window 430. The first coating layer 4311 and the second coating layer 4312 may be substantially formed as one. For example, the coating thickness T of the first coating layer 4311 may be 20 micrometer (μm) to 40 μm. For example, the length L of the second coating layer 4312 extending inward from the edge may be 180 μm to 300 μm based on an end portion of the first coating layer 4311. However, this is an example, and the thickness and/or length of the first coating layer 4311 and the second coating layer 4312 are not limited thereto.

In the case of a comparative embodiment, the window limit test average is about 193 times, but in the case that the coating layer 431 is formed on the edge of the window 430 according to an embodiment, it has been confirmed that the window limit test average increased to about 300 times. In addition, in the case of the comparative embodiment, the Charpy breakage angle is about 41.7°, but in the case that the coating layer 431 is formed on the edge of the window 430 according to an embodiment, it is confirmed that the Charpy breakage angle increased to about 75°. As a result, even when a gap is formed between the window 430 and the housing 410 as the display 420 is directly adhered to the housing 410, the coating layer 431 may be formed on the edge of the window 430 such that damage to the window 430 due to collision between the window 430 and the housing 410 may be reduced.

According to one or more embodiments of the present disclosure, an electronic device 400 may include a housing 410 including a first housing 411 facing a first direction and a second housing 412 facing a second direction opposite to the first direction. The electronic device 400 may include a display 420 disposed on a surface of the first housing 411 facing the first direction. The electronic device 400 may include a window 430 disposed on a surface of the display 420 facing the first direction. The electronic device 400 may include a first adhesive member 440 disposed along an edge of a surface of the display 420 facing the second direction and configured to adhere the edge of the surface of the display 420 facing the second direction to the surface of the first housing 411 facing the first direction. The electronic device 400 may include an actuator 450 located in an inner space of the housing 410 and configured to generate sound by vibrating the display 420, wherein the actuator 450 is located in the second direction relative to the display 420.

In an embodiment, the first housing 411 may include an arrangement portion 4111 in which the actuator 450 is disposed on a surface of the first housing 411 facing the second direction.

In an embodiment, the first housing 411 may further include at east one cut portion 4112 formed by cutting a portion of the first housing 411 from the outside of the arrangement portion 4111.

In an embodiment, the at least one cut portion 4112 may be formed along the outer circumference of the arrangement portion 4111.

In an embodiment, the electronic device 400 may further include a support structure 460 coupled to the first housing 411 and configured to support the actuator 450 disposed in the arrangement portion 4111 from the second direction.

In an embodiment, the support structure 460 may be spaced apart from the second housing 412 in the first direction.

In an embodiment, the electronic device 400 may further include a second adhesive member 470 interposed between a surface of the arrangement portion 4111 facing the first direction and the surface of the display 420 facing the second direction and configured to adhere the surface of the arrangement portion 4111 facing the first direction and the surface of the display 420 facing the second direction to each other.

In an embodiment, the vibration generated by the actuator 450 may be transmitted to the display 420 via the arrangement portion 4111 and the second adhesive member 470.

In an embodiment, the modulus of the first adhesive member 440 may be less than the modulus of the second adhesive member 470.

In an embodiment, the modulus of the first adhesive member 440 may be 0.05 MPa or less.

In an embodiment, an edge of the window 430 may be spaced apart from the housing 410 in order not to contact the housing 410 (e.g., such that the edge of the window 430 does not contact the housing 410).

In an embodiment, a coating layer 431 may be funned on the edge of the window 430.

In an embodiment, the coating layer 431 may include a first coating layer 4311 formed on the edge of the side surface of the window 430 and a second coating layer 4312 formed on an edge of a surface of the window 430 facing the second direction.

In an embodiment, the actuator 450 may be located between a ⅓ point W1 and a ⅔ point W2 based on the width direction of the electronic device 400.

In an embodiment, the actuator 450 may be spaced apart from an edge of the electronic device 400 by at least 10 mm.

In an embodiment, the electronic device 400 may include: the housing 410; the display 420 disposed in the front surface of the housing 410; the window 430 disposed in the front surface of the display 420; a first adhesive member 440 disposed along a rear edge of the display 420 and configured to adhere the rear edge of the display 420 to the front surface of the housing 410; and the actuator 450 disposed in the housing 410 from a rear side of the display 420 and configured to generate sound by vibrating the display 420.

In an embodiment, the housing 410 may include at least one cut portion 4112 formed by cutting a portion of the housing 410 around a position (e.g., location) in which the actuator 450 is disposed.

In an embodiment, the electronic device 400 may further include the support structure 460 located in the inner space of the housing 410, coupled to the housing 410 and configured to support the rear surface of the actuator 450, and spaced apart from the rear surface of the housing 410.

In an embodiment, the edge of the window 430 may be spaced apart from the housing 410 in order not to contact the housing 410 (e.g., such that the edge of the window 430 does not contact the housing 410), and the coating layer 431 may be formed on the edge of the window 430.

In an embodiment, the electronic device 400 may include the housing 410 including the first housing 411 facing the first direction and the second housing 412 facing the second direction opposite to the first direction. The electronic device 400 may include the display 420 disposed on the surface of the first housing 411 facing the first direction. The electronic device 400 may include the window 430 disposed on the surface of the display 420 facing the first direction. The electronic device 400 may include the first adhesive member 440 disposed along the edge of the surface of the display 420 facing the second direction and configured to adhere the edge of the surface of the display 420 facing the second direction to the surface of the first housing 411 facing the first direction. The electronic device 400 may include the actuator 450 located in the inner space of the housing 410 and configured to generate sound by vibrating the display 420, wherein the actuator 450 is located in the second direction relative to the display 420. The first housing 411 may include the arrangement portion 4111 in which the actuator 450 is disposed on the surface of the first housing 411 facing the second direction. The first housing 411 may include at least one cut portion 4112 formed along the outer circumference of the arrangement portion 4111 by cutting a portion of the first housing 411. The electronic device 400 may further include the second adhesive member 470 interposed between the surface of the arrangement portion 4111 facing the first direction and the surface of the display 420 facing the second direction and configured to adhere the surface of the arrangement portion facing the first direction and the surface of the display facing the second direction to each other. The vibration generated by the actuator 450 may be transmitted to the display 420 via the arrangement portion 4111 and the second adhesive member 470.

The invention claimed is:

1. An electronic device comprising:

a housing comprising a first housing facing a first direction and a second housing facing a second direction opposite to the first direction;

a display disposed on a surface of the first housing facing the first direction;

a window disposed on a surface of the display facing the first direction;

a first adhesive member disposed along an edge of a surface of the display facing the second direction and configured to adhere the edge of the surface of the display facing the second direction to the surface of the first housing facing the first direction; and an actuator located in an inner space of the housing and configured to generate sound by vibrating the display, wherein the actuator is located in the second direction relative to the display, wherein the first housing comprises:

an arrangement portion in which the actuator is disposed on a surface of the first housing facing the second direction; and at least one cut portion formed by cutting a portion of the first housing from an outside of the arrangement portion, and wherein the at least one cut portion is formed along an outer circumference of the arrangement portion.

2. The electronic device of claim 1, further comprising:

a support structure coupled to the first housing and configured to support the actuator disposed in the arrangement portion from the second direction.

3. The electronic device of claim 2, wherein the support structure is spaced apart from the second housing in the first direction.

4. The electronic device of claim 1, further comprising:

a second adhesive member interposed between a surface of the arrangement portion facing the first direction and the surface of the display facing the second direction and configured to adhere the surface of the arrangement portion facing the first direction and the surface of the display facing the second direction to each other.

5. The electronic device of claim 4, wherein vibration generated by the actuator is transmitted to the display via the arrangement portion and the second adhesive member.

6. The electronic device of claim 4, wherein a modulus of the first adhesive member is less than a modulus of the second adhesive member.

7. The electronic device of claim 1, wherein a modulus of the first adhesive member is equal to or less than 0.05 mega pascals (MPa).

8. The electronic device of claim 1, wherein an edge of the window is spaced apart from the housing such that the edge of the window does not contact the housing.

9. The electronic device of claim 8, wherein a coating layer is formed on the edge of the window.

10. The electronic device of claim 9, wherein the coating layer comprises:

a first coating layer formed on a side edge of the window; and a second coating layer formed on an edge of a surface of the window facing the second direction.

11. The electronic device of claim 1, wherein the actuator is located between a ⅓ point and a ⅔ point based on a width direction of the electronic device.

12. The electronic device of claim 1, wherein the actuator is spaced apart from an edge of the electronic device by at least 10 millimeters (mm).

13. An electronic device comprising:

a housing;

a display disposed on a front surface of the housing;

a window disposed on a front surface of the display;

a first adhesive member disposed along a rear edge of the display and configured to adhere the rear edge of the display to the front surface of the housing; and an actuator disposed in the housing from a rear side of the display and configured to generate sound by vibrating the display, wherein the housing comprises:

an arrangement portion in which the actuator is disposed on a rear surface of the housing; and at least one cut portion formed by cutting a portion of the housing from an outside of the arrangement portion, and wherein the at least one cut portion is formed along an outer circumference of the arrangement portion.

14. The electronic device of claim 13, further comprising:

a support structure located in an inner space of the housing, coupled to the housing and configured to support a rear side of the actuator, and spaced apart from a rear surface of the housing.

15. The electronic device of claim 13, wherein an edge of the window is spaced apart from the housing such that the edge of the window does not contact the housing, and a coating layer is formed on the edge of the window.

* * * * *